(12) United States Patent
Yu

(10) Patent No.: US 7,134,983 B2
(45) Date of Patent: Nov. 14, 2006

(54) SHIFT CONTROL METHOD OF AUTOMATIC TRANSMISSION FOR VEHICLES

(75) Inventor: Pyung Hwan Yu, Suwon (KR)

(73) Assignee: Hyundai Motor Company, Seoul (KR)

( * ) Notice: Subject to any disclaimer, the term of this patent is extended or adjusted under 35 U.S.C. 154(b) by 196 days.

(21) Appl. No.: 11/007,714

(22) Filed: Dec. 7, 2004

(65) Prior Publication Data

US 2005/0130798 A1    Jun. 16, 2005

(30) Foreign Application Priority Data

Dec. 10, 2003 (KR) .................. 10-2003-0089622

(51) Int. Cl.
*B60W 10/02* (2006.01)
*B60W 10/04* (2006.01)
*B60W 10/10* (2006.01)

(52) U.S. Cl. .................. 477/79; 477/70; 477/174; 477/180

(58) Field of Classification Search .................. 477/79, 477/70, 174–175, 180
See application file for complete search history.

(56) References Cited

U.S. PATENT DOCUMENTS

| | | | | |
|---|---|---|---|---|
| 4,942,787 A | * | 7/1990 | Aoki et al. | 477/152 |
| 5,020,391 A | * | 6/1991 | Aoki et al. | 477/143 |
| 5,908,370 A | * | 6/1999 | Kubo et al. | 477/144 |
| 6,537,170 B1 | * | 3/2003 | Murasugi et al. | 475/128 |
| 6,537,181 B1 | * | 3/2003 | Asayama et al. | 477/174 |
| 6,974,009 B1 | * | 12/2005 | Hoshiya et al. | 192/3.63 |

FOREIGN PATENT DOCUMENTS

JP    06-316231    11/1994

* cited by examiner

*Primary Examiner*—Tisha Lewis
(74) *Attorney, Agent, or Firm*—Morgan Lewis & Bockius LLP

(57) ABSTRACT

A shift control method and system for an automatic transmission. The control method includes calculating a clutch engaging pressure for each shift speed corresponding to an engine load and calculating an optimal engaging pressure for an operating clutch in each shift ratio. The system includes a control unit and sensors for executing the method.

8 Claims, 4 Drawing Sheets

SHIFT CONTROL METHOD OF AUTOMATIC TRANSMISSION FOR VEHICLES

CROSS REFERENCE TO RELATED APPLICATION

This application claims priority of Korean Application No. 10-2003-0089622, filed on Dec. 10, 2003, the disclosure of which is incorporated herein by reference.

TECHNICAL FIELD OF THE INVENTION

The present invention relates to a shift control method of an automatic transmission for vehicles, and more particularly, to a shift control method that improves shift responsiveness and shift feeling by minimizing hydraulic pressure change during a gear shift.

BACKGROUND OF THE INVENTION

Generally, in automatic transmissions that are applied to a vehicle, a shift control device controls hydraulic pressure through control of a plurality of solenoid valves based on various conditions such as a vehicle speed and a throttle opening ratio. When the driver manipulates the shift lever to a desired shift range, a port conversion in a manual valve occurs and various operating elements of the gear shift mechanism are selectively operated according to the duty control of the solenoid valve using hydraulic pressure supplied from an oil pump. A gear shift is thereby performed.

Because vehicles having such automatic transmissions may be exposed to various driving conditions, companies invest in extensive research for improving performance of the engine and automatic transmission. In particular, in the case of the automatic transmission, research directed to shift control methods for controlling automatic transmissions are widely performed. In one exemplary method, if it is determined that a kickdown shift is performed as a result of a driver's abrupt depression of an acceleration pedal, a transmission control unit controls a line pressure to be a maximum value. Then, if it is determined that a predetermined time has elapsed, the transmission control unit generates a shift signal and performs a shift control. In such a conventional shift control, if a shift signal is generated in a state that each clutch is supplied with normal line pressure, the line pressure is controlled to rise to its maximum value, and a shift is performed after a predetermined time has lapsed. After the shift has been started, line pressure is supplied as an engaging pressure according to 100% of a line pressure duty.

In the above-stated conventional control, the line pressure is preferably determined by multiplying a highest clutch engaging pressure of the clutch engaging pressures for all shift ratios by a safety factor. However, in such a conventional shift control, if a shift is performed, the line pressure is controlled to its maximum value, and the shift signal is generated after the predetermined time has lapsed. Accordingly, as shown in a region A of FIG. 4, a release pressure increases for a moment and then decreases, so that a shift delay time to an actual shift point becomes long. Thus, a shift responsiveness and a shift feeling deteriorate.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiment of the present invention provide a shift control method for an automatic transmission in which an engaging pressure is controlled at the optimal engaging pressure, a hydraulic pressure can be rapidly released from an off-going friction element and an amount of a change in the hydraulic pressure is relatively small, in order to improve a shift responsiveness and a shift feel.

An exemplary shift control method for an automatic transmission according to an embodiment of the present invention comprises: calculating a clutch engaging pressure for each shift speed corresponding to an engine load, while a line pressure variable control is being performed, and performing a hydraulic pressure control using the calculated clutch engaging pressure; and calculating an optimal engaging pressure for an operating clutch in each shift ratio, if a shift command according to a change in vehicle operating conditions during the performing of the hydraulic pressure control is generated, generating a corresponding shift signal and performing a shift control using the calculated optimal engaging pressure.

In another embodiment of the present invention, the optimal engaging pressure in each shift ratio is calculated as follows: (optimal engaging pressure)={required torque ratio*×input torque×torque ratio safety factor/(clutch capacity)}, where the required torque ratio is a ratio of a torque for each clutch to a total input torque.

In another further embodiment of the present invention, a shift control system for an automatic transmission includes a transmission control unit programmed to execute instructions for calculating a clutch engaging pressure for each shift speed corresponding to an engine load, while a line pressure variable control is being performed, and performing a hydraulic pressure control using the calculated clutch engaging pressure. An optimal engaging pressure for an operating clutch in each shift ration is calculated if a shift command according to a change in vehicle operating conditions during the performing of the hydraulic pressure control is generated, generating a corresponding shift signal and performing a shift control using the calculated optimal engaging pressure. A shift control condition means communicates with the transmission control unit to provide information regarding transmission operating parameters. An engine control condition detection means communicates with the engine control unit to provide information regarding engine operating parameters to the transmission control unit through communication with the engine control unit. At least one damper clutch control member and at least one shift control driving member each communicate with the transmission control unit and receive signals for transmission control therefrom.

The transmission control unit further includes instructions for calculating the optimal engaging pressure in each shift ratio according to the formula:

(optimal engaging pressure)={required torque ratio*×input torque×torque ratio safety factor/(clutch capacity)}, where the required torque ratio is a ratio of a torque for each clutch to a total input torque. The optimal engaging pressure is determined from a map data having optimal engaging pressures with respect to engine loads.

In a further embodiment of the present invention, the optimal engaging pressure is determined from a map data having optimal engaging pressure predetermined with respect to engine loads.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
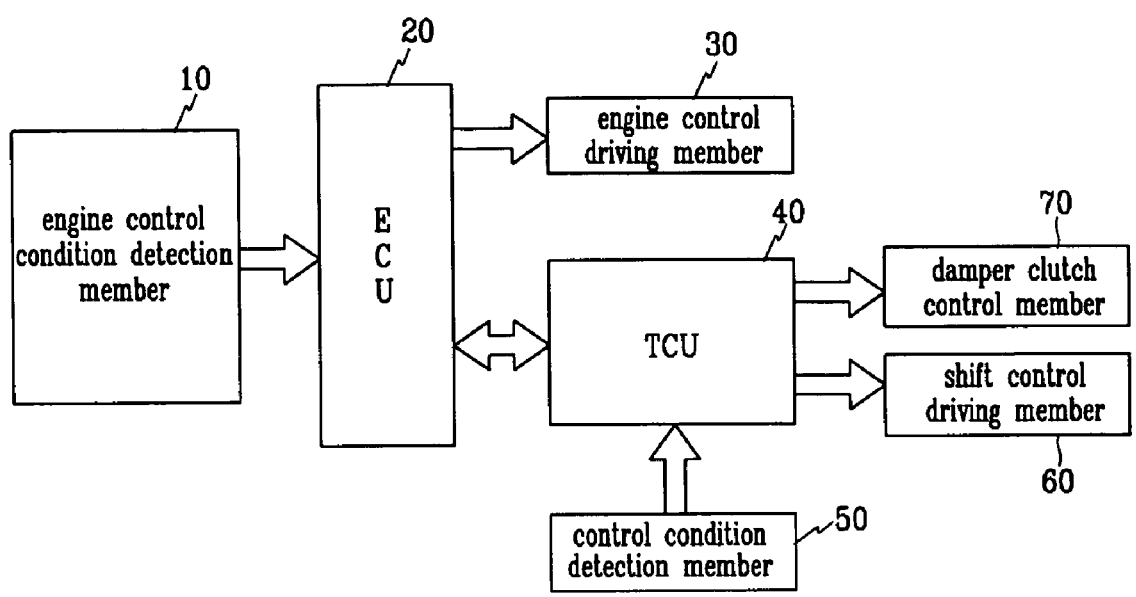
FIG. 1 is a block diagram of a control system for performing a shift control method according to an embodiment of the present invention.

As shown in FIG. 1, current vehicle driving conditions are input to an engine control unit (hereinafter referred to as an ECU) 20 from an engine control condition detection member 10 that includes various sensors. The ECU 20 compares the input vehicle driving conditions with pre-stored data and controls an engine control driving member 30 based on that comparison to operate an engine in an optimal state.

Simultaneously, the ECU 20 transmits information required for shift control to a transmission control unit (hereinafter referred to as a TCU) 40, and the transmitted information is used for a shift control. The TCU 40 compares information input from the ECU 20 and information input from a shift control condition detection member 50 with predetermined data, and controls a shift control driving member 60 and a damper clutch control member 70, thereby performing an optimal shift control.

The ECU 20 and TCU 40 preferably each include a processor, a memory, and other necessary hardware and software components as will be understood by persons skilled in the art, to permit the control unit to communicate with sensors and execute the control function as described herein. For example, the processor may be configured to be activated by predetermined programs that can be programmed to perform each corresponding step of a shift control method according to an embodiment of the present invention.

The engine control condition detection member 10, as is generally known in the art, may include various sensors, which detect information needed for an engine control, such as a vehicle speed sensor, a crank angle sensor, an engine speed sensor, a coolant temperature sensor, a turbine speed sensor, a throttle position sensor, and the like. The shift control condition detection member 50 may include various sensors, which detect information needed for a shift control, such as an input shaft speed sensor, an output shaft speed sensor, a hydraulic oil temperature sensor, an inhibitor switch, a brake switch, and the like.

The engine control driving member 30 may include all driving members for an engine control, the shift control driving member 60 may include all solenoid valves of hydraulic pressure control means of an automatic transmission, and the damper clutch control member 70 may include a solenoid valve for operating a damper clutch or releasing an operation of the damper clutch according to a predetermined control scheme.

Information can be transmitted from the ECU 20 to the TCU 40 through various medium. For example, the medium can be a CAN communication.

Figure 2:
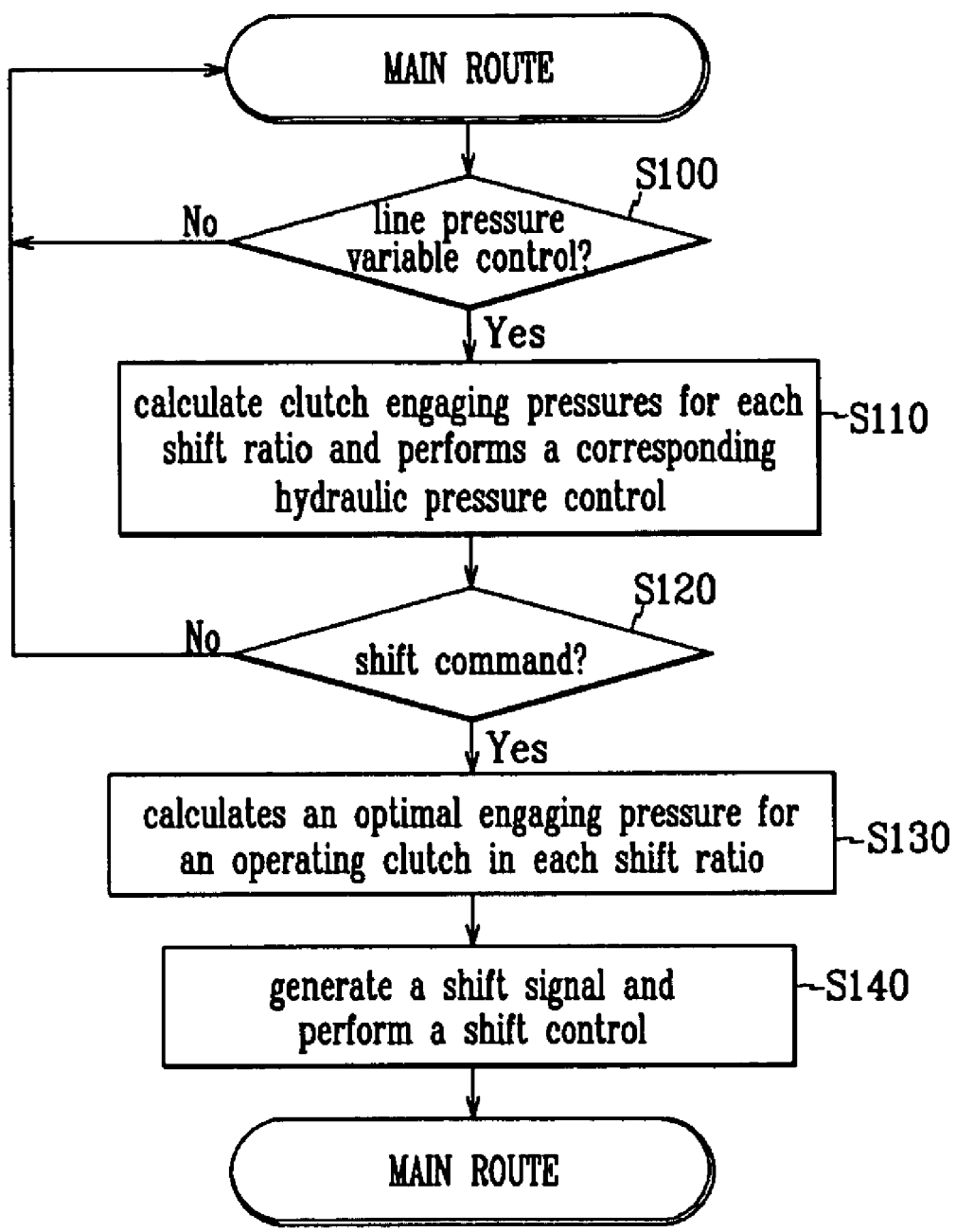
FIG. 2 is a flow chart showing a shift control method according to an embodiment of the present invention.
Figure 3:
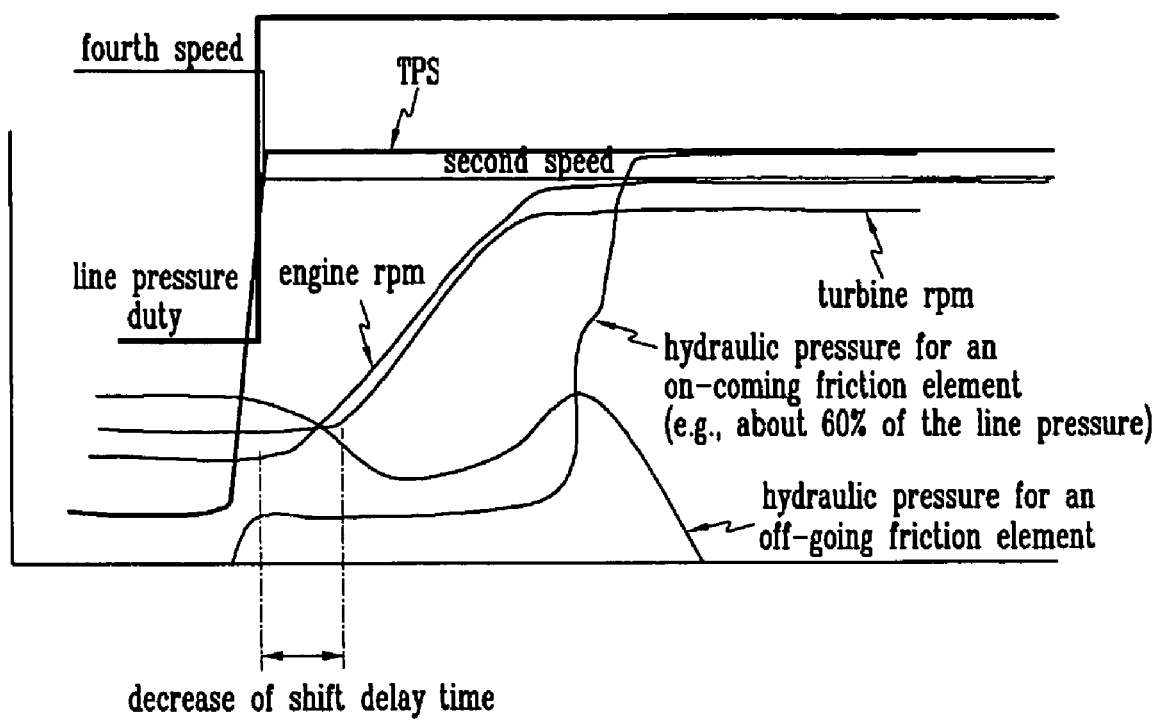
FIG. 3 shows a hydraulic pressure control pattern of the shift control method according to the embodiment of the present invention.
Figure 4:
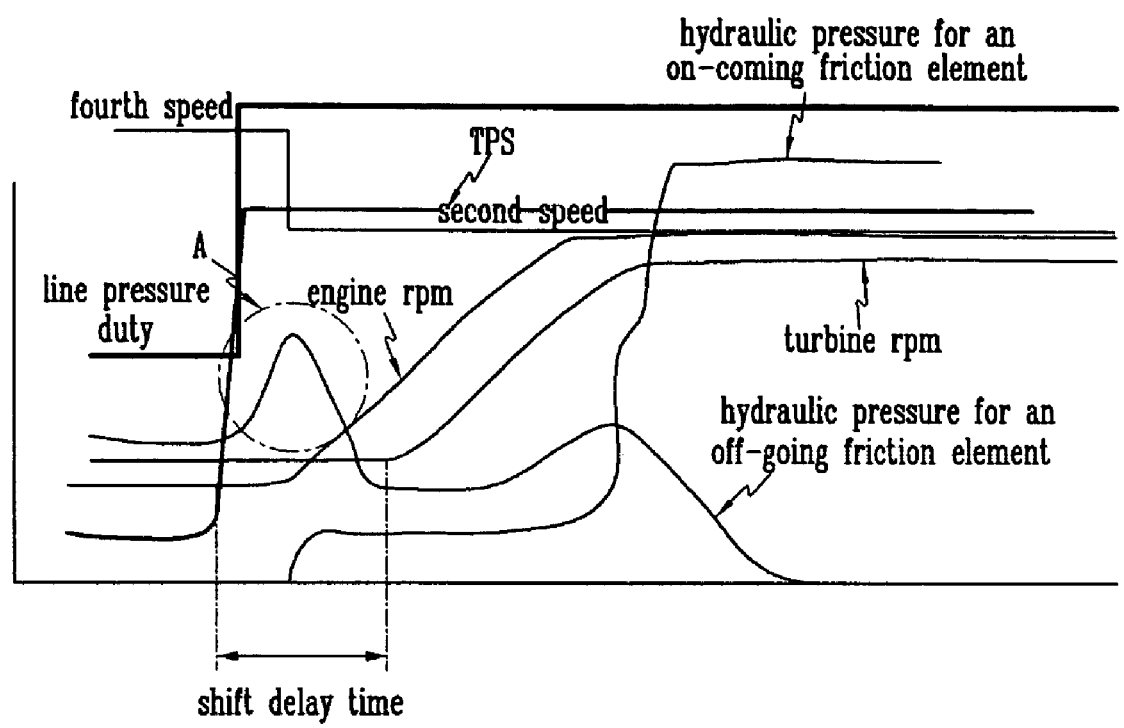
FIG. 4 shows a hydraulic pressure control pattern of the shift control method according to the conventional shift control method.

Referring to FIG. 2, the shift control method according to an embodiment of the present invention using the above-stated control system will be explained in detail hereinafter.

In step S100, while a vehicle is running, the TCU 40 determines whether a line pressure variable control is being currently performed. If it is determined that the line pressure variable control is being currently performed, the TCU 40 calculates clutch engaging pressures for each shift ratio according to an engine load (e.g., a throttle opening angle or an engine torque) and performs a corresponding hydraulic pressure control in step S110.

The line pressure control in step S100 means a line pressure variable control for a whole hydraulic control system according to current driving conditions.

In step S120, it is determined whether a shift command responding to a change of driving conditions has been generated while a hydraulic pressure corresponding to the clutch engaging pressure calculated in step S110 is being supplied to an operating clutch, and if so, in step S130, the TCU 40 calculates again an optimal engaging pressure for an operating clutch in each shift ratio. That is, the TCU 40 calculates an optimal engaging pressure for an on-coming clutch that is going to be engaged in a new shift ratio corresponding to the generated shift command. Preferably, the optimal engaging pressure is proportional to an engine load (e.g., a throttle opening angle or an engine torque). Then, at step S140, the TCU 40 generates a shift signal and performs a shift control using the calculated engaging pressure.

Because friction elements (clutch or brake) that selectively operate in each shift ratio are independently controlled, an optimal pressure for controlling each friction element in each shift ratio may exist, and the above-stated optimal engaging pressure for the operating clutch means this optimal pressure for controlling each friction element.

The optimal engaging pressure for clutches in each shift ratio can be easily calculated by calculating a required torque ratio of a corresponding clutch in a speed diagram, and for example, it can be calculated as follows:

"optimal engaging pressure={required torque ratio*× input torque×torque ratio safety factor(e.g., 1.3)/ clutch capacity}", where the required torque ratio is a ratio of a torque for each clutch to a total input torque and may be calculated by setting an input torque as "1" in the speed diagram.

Although the optimal engaging pressure for each shift ratio can be calculated during the control, as stated in the above, the optimal engaging pressure can also be determined using a map data having optimal engaging pressure predetermined with respect to engine loads (e.g., throttle opening).

The engine load can be changed according to changes in driving conditions, and therefore the optimal engaging pressure is re-calculated to obtain an optimal value corresponding to current engine load at step S130.

In the conventional shift control method, because the line pressure is controlled to be a maximum value and an engaging pressure of the off-going clutch is controlled by the same pressure with the line pressure, the delay time to the start of a real shifting process becomes long. However, according to the embodiment of the present invention, the engaging pressure is controlled at an optimal engaging pressure (e.g., it can be 60% of the line pressure or some other some other pressure) rather than the line pressure, thus the hydraulic pressure can be rapidly released from the off-going friction element and an amount of a change in the hydraulic pressure is relatively small. Therefore, according to the shift control method of the embodiment of the present invention, a shift responsiveness and a shift feel is substantially improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A shift control method for an automatic transmission, comprising:
    calculating a clutch engaging pressure for each shift speed corresponding to an engine load, while a line pressure variable control is being performed, and performing a hydraulic pressure control using the calculated clutch engaging pressure; and
    calculating an optimal engaging pressure for an operating clutch in each shift ratio, if a shift command according to a change in vehicle operating conditions during the performing of the hydraulic pressure control is generated, generating a corresponding shift signal and performing a shift control using the calculated optimal engaging pressure.

2. The shift control method of claim 1, wherein the optimal engaging pressure in each shift ratio is calculated as follows:
    (optimal engaging pressure)={required torque ratio*×input torque×torque ratio safety factor/(clutch capacity)}, where the required torque ratio is a ratio of a torque for each clutch to a total input torque.

3. The shift control method of claim 1, wherein the optimal engaging pressure is determined from a map data having optimal engaging pressures with respect to engine loads.

4. A shift control system for an automatic transmission, comprising:
    a transmission control unit programmed to execute instructions for
    calculating a clutch engaging pressure for each shift speed corresponding to an engine load, while a line pressure variable control is being performed, and performing a hydraulic pressure control using the calculated clutch engaging pressure; and
    calculating an optimal engaging pressure for an operating clutch in each shift ratio, if a shift command according to a change in vehicle operating conditions during the performing of the hydraulic pressure control is generated, generating a corresponding shift signal and performing a shift control using the calculated optimal engaging pressure; and
    a shift control condition means communicating with said transmission control unit to provide information regarding transmission operating parameters.

5. The system of claim 4, further comprising engine control condition detection means communicating with an engine control unit to provide information regarding engine operating parameters to said transmission control unit through communication with said engine control unit.

6. The system of claim 5, further comprising at least one damper clutch control member and at least one shift control driving member, each said member communicating with the transmission control unit and receiving signals for transmission control therefrom.

7. The system of claim 6, wherein said transmission control unit further includes instructions for calculating the optimal engaging pressure in each shift ratio according to the formula:
    (optimal engaging pressure)={required torque ratio*×input torque×torque ratio safety factor/(clutch capacity)}, where the required torque ratio is a ratio of a torque for each clutch to a total input torque.

8. The system of claim 4, wherein the optimal engaging pressure is determined from a map data having optimal engaging pressures with respect to engine loads.

* * * * *